United States Patent
Sun et al.

(10) Patent No.: US 12,035,238 B2
(45) Date of Patent: Jul. 9, 2024

(54) TRACKING REFERENCE SIGNAL ENHANCEMENTS FOR NEW RADIO

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Hongbo Yan, Vista, CA (US); Huaning Niu, San Jose, CA (US); Shengshan Cui, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 362 days.

(21) Appl. No.: 17/593,516

(22) PCT Filed: Oct. 14, 2020

(86) PCT No.: PCT/CN2020/120925
§ 371 (c)(1),
(2) Date: Sep. 20, 2021

(87) PCT Pub. No.: WO2022/077277
PCT Pub. Date: Apr. 21, 2022

(65) Prior Publication Data
US 2022/0322231 A1 Oct. 6, 2022

(51) Int. Cl.
*H04W 76/28* (2018.01)
*H04W 52/02* (2009.01)
*H04W 76/27* (2018.01)

(52) U.S. Cl.
CPC ....... *H04W 52/0229* (2013.01); *H04W 76/27* (2018.02); *H04W 76/28* (2018.02)

(58) Field of Classification Search
CPC . H04W 52/0229; H04W 76/27; H04W 76/28; H04W 88/06; H04L 5/005; H04L 5/0092; H04L 5/0007; Y02D 30/70
See application file for complete search history.

(56) References Cited

U.S. PATENT DOCUMENTS 10,735,166 B2 * 8/2020 Au ................ H04W 52/0216
11,317,416 B2 * 4/2022 Gordaychik ............ H04W 8/22
(Continued)

FOREIGN PATENT DOCUMENTS

| CN | 116711396 A * | 9/2023 |
|---|---|---|
| EP | 3648514 | 5/2020 |
| WO | 2020/173827 | 9/2020 |

OTHER PUBLICATIONS

Vivo, "Discussion on TRS/CSI-RS occasion(s) for idle/inactive UEs"; 3GPP TSG RAN WG1 #102-e; R1-2005389; Aug. 28, 2020; 7 Sheets.

*Primary Examiner* — Julio R Perez
(74) *Attorney, Agent, or Firm* — Fay Kaplun & Marcin, LLP (57) ABSTRACT

A user equipment (UE) receives reference signals during a discontinuous reception (DRX) cycle to perform frequency and timing tracking or automatic gain control (AGC). The UE receives configuration information corresponding to a reference signal that is to be transmitted to a user equipment (UE) when the UE is in a first operating state, receives the reference signal from a cell of a network when the UE is in the first operating state, performs one of frequency and timing tracking or automatic gain control (AGC) using the reference signal and receives a signal from the cell during a time window that the UE is scheduled to utilize an active mode of data exchange processing.

17 Claims, 9 Drawing Sheets

(56) References Cited

U.S. PATENT DOCUMENTS

| | | | |
|---|---|---|---|
| 2018/0227848 A1* | 8/2018 | Lee | H04W 52/0216 |
| 2019/0215117 A1* | 7/2019 | Lee | H04L 5/0048 |
| 2019/0254069 A1 | 8/2019 | Ahn et al. | |
| 2020/0146107 A1 | 5/2020 | Xiong et al. | |
| 2020/0287978 A1 | 9/2020 | Smith et al. | |
| 2022/0303089 A1* | 9/2022 | Liao | H04W 68/02 |
| 2022/0303900 A1* | 9/2022 | Sun | H04W 52/0216 |
| 2022/0322231 A1* | 10/2022 | Sun | H04L 5/005 |

\* cited by examiner

TRACKING REFERENCE SIGNAL ENHANCEMENTS FOR NEW RADIO

BACKGROUND

A user equipment (UE) may establish a connection to at least one of multiple different networks or types of networks. When connected, the UE may be configured to utilize a power saving mode of operation that includes a set of active processing time periods and a set of available sleep time periods. A scheduled active processing time period may be referred to as an OnDuration. During an OnDuration, the UE is configured to perform operations that enable the UE to receive data that may be transmitted to the UE. When an OnDuration is not scheduled, the UE has an opportunity to enter a sleep mode and conserve power.

For any of a variety of different reasons, when the UE wakes up and enters the active mode of processing, there may be a frequency and/or timing error. From the UE perspective, this may have negative impact on the processing of subsequent control information and/or data. In some networks, to avoid a frequency and/or timing error at the UE, a downlink reference signal may be provided by the currently camped cell. For example, the UE may receive a tracking reference signal (TRS) that is configured to be used for time and/or frequency tracking.

SUMMARY

Some exemplary embodiments are related to a baseband processor configured to perform operations. The operations include receiving configuration information corresponding to a reference signal that is to be transmitted to a user equipment (UE) when the UE is in a first operating state, receiving the reference signal from a cell of a network when the UE is in the first operating state, performing one of frequency and timing tracking or automatic gain control (AGC) using the reference signal and receiving a signal from the cell during a time window that the UE is scheduled to utilize an active mode of data exchange processing.

Other exemplary embodiments are related to a user equipment (UE) including a transceiver configured to communicate with a network and a processor communicatively coupled to the transceiver and configured to perform operations. The operations include receiving configuration information corresponding to a reference signal that is to be transmitted to a user equipment (UE), receiving the reference signal from a cell of the network, performing one of frequency and timing tracking or automatic gain control (AGC) using the reference signal and receiving a signal from the cell, wherein receiving the signal includes decoding the signal based on the frequency and timing tracking.

DETAILED DESCRIPTION

The exemplary embodiments may be further understood with reference to the following description and the related appended drawings, wherein like elements are provided with the same reference numerals. The exemplary embodiments relate to implementing various enhancements related to tracking reference signal (TRS) transmission and reception.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

In addition, the exemplary embodiments are described with regard to the UE utilizing a power saving mode of operation with regard to data exchange processing. To provide an example, when the UE is in an RRC connected state, the UE may be configured with a connected discontinuous reception (C-DRX). To provide another example, when the UE is in an RRC idle state, the UE may be configured with a discontinuous reception cycle (DRX). Those skilled in the art will understand that these cycles refer to power saving mechanisms that include utilizing an active mode of data exchange processing and a sleep mode of inactivity.

The UE may use the active mode of processing at defined intervals to perform scheduled operations such as performing measurements related to the network conditions, transmitting (e.g., requests, measurement reports, uplink data etc.), and receiving (e.g. control channel information, reference signals, synchronization signals, downlink data, etc.). The time period that the UE may be scheduled to receive control channel information may be termed the OnDuration. The OnDuration relates to a duration over which the UE may perform operations that enable the UE to receive data that may be transmitted to the UE such as but not limited to, control channel information, an uplink grant, a downlink grant, reference signals, synchronization signals, payload data etc. During a C-DRX or DRX cycle, when an OnDuration is not scheduled the UE may have an opportunity to utilize the sleep mode of inactivity and conserve power.

A C-DRX or DRX cycle may have a predetermined duration N such as 100 milliseconds (ms), 50 ms, 40 ms, 20 ms, etc. For example, at a time 0, there may be a OnDuration during which the active mode of processing is used. Subsequently, upon the conclusion of the OnDuration, the UE has an opportunity to utilize the sleep mode of inactivity. Then at a time N, there may be another OnDuration. Subsequently, the sleep mode is used until a time 2N. This process continues for the duration of the cycle. Reference to the sleep mode of inactivity does not necessarily mean putting the processor, the transmitter, and the receiver of the UE to sleep, in hibernation, or in deactivation. For example, the processor (e.g., baseband and/or application) may continue to execute other applications or processes. The sleep mode relates to conserving power by discontinuing a continuous processing functionality relating to operations that enable the UE to receive data that may be transmitted to the UE and transmit data to the network. Reference to the terms to C-DRX cycle and DRX cycle is for illustrative purposes, different networks may refer to similar concepts by a different name. Further, reference to these cycles being configured in ms units is merely for illustrative purposes, the exemplary embodiments may utilize a C-DRX or DRX cycle that is based on subframes or any other suitable unit of time.

For any of a variety of different reasons, when the UE wakes up and enters the active mode of data exchange processing, the UE may experience a frequency and/or timing error. This may have a negative impact on the processing of subsequent control information and/or data. In some networks, to avoid a frequency and/or timing error at the UE, a downlink reference signal may be provided by the currently camped cell. For example, the UE may receive a tracking reference signal (TRS) that is configured to be used for time and/or frequency tracking.

Throughout this description, the term "TRS" may refer to a downlink reference signal that is configured to be used by the UE for time and/or frequency tracking. To provide an example, the UE may be camped on a cell of the network. The network may indicate to the UE that a TRS (e.g., one or more TRS symbols in one or more slots) is to be transmitted to the UE during a particular time window and/or in response to certain conditions. The UE may monitor for the TRS in accordance with the indication received from the network and then use the TRS to acquire frequency and/or timing estimation. This may provide performance benefits with regard to the processing of subsequent control information (e.g., downlink control information (DCI), etc.) and/or data (e.g. physical downlink shared channel (PDSCH)) from the cell. However, reference to the term TRS and the above example is merely provided for illustrative purposes. The exemplary embodiments may apply to any type of downlink reference signal that may be used by the UE for timing and frequency tracking, automatic gain control (AGC) or any other similar type of operation.

Various exemplary embodiments are described with regard to a cell transmitting one or more TRS to the UE prior to an onDuration of a C-DRX or DRX cycle. However, the exemplary embodiments are not limited to these types of power saving mechanisms. The exemplary embodiments relate to implementing various enhancements related to TRS transmission and reception regardless of the type of power saving mode operation being utilized. Those skilled in the art will understand that these enhancements may be utilized in conjunction with any currently implemented power saving mode of data exchange processing, any future implementation of a power saving mode of data exchange processing or independently from any power saving mode of data exchange processing.

In a first aspect, the exemplary embodiments relate to implementing TRS for idle mode (or inactive mode). In a second aspect, the exemplary embodiments relate to implementing a downlink control information (DCI) trigger for TRS reception. Specific examples of these exemplary embodiments will be described in more detail below.

Figure 1:
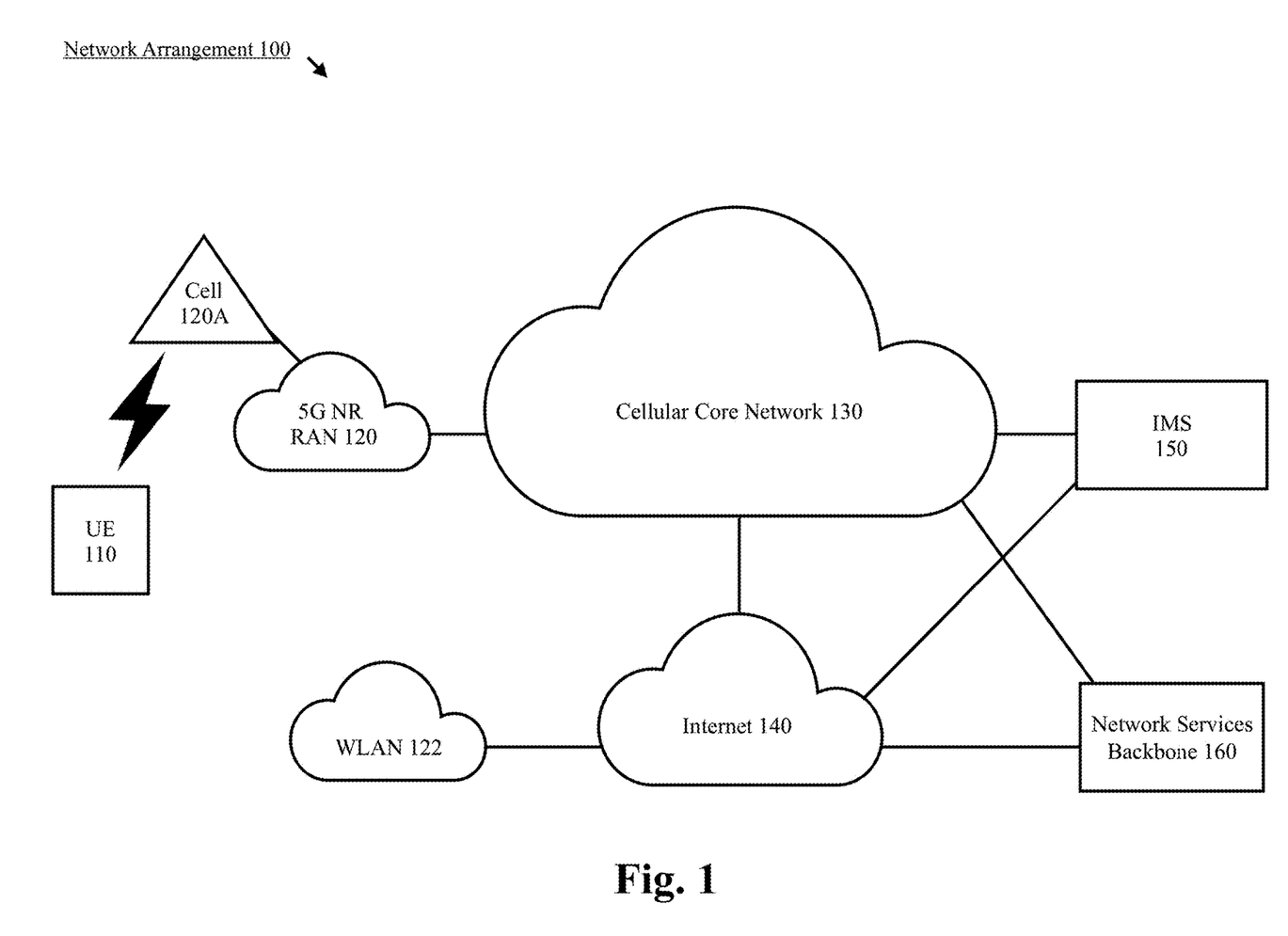
FIG. 1 shows an exemplary network arrangement according to various exemplary embodiments.

FIG. 1 shows a network arrangement 100 according to various exemplary embodiments. The network arrangement 100 includes the UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may be configured to communicate directly with one or more networks. In the example of the network arrangement 100, the UE 110 may wirelessly communicate with a 5G new radio (NR) radio access network (5G NR RAN) 120 and a wireless local access network (WLAN) 122. The UE 110 may also communicate with other types of networks (e.g., a 5G cloud RAN, a next generation RAN (NG-RAN), an LTE RAN, a legacy RAN etc.). The UE 110 may also communicate with networks over a wired connection. Therefore, the UE 110 may include a 5G NR chipset to communicate with the 5G NR RAN 120 and an ISM chipset to communicate with the WLAN 122.

The 5G NR RAN 120 may be a portion of a cellular network that may be deployed by a network carrier (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The UE 110 may connect to the 5G NR RAN 120 via a cell 120A. Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the cell 120A of the 5G NR RAN 120). As mentioned above, the use of the 5G NR RAN 120 is for illustrative purposes and any type of network may be used. For example, the UE 110 may also connect to the LTE-RAN (not pictured) or the legacy RAN (not pictured).

The cell 120A may be equipped with one or more communication interfaces. For example, the cell 120A may be equipped with a communication interface that is configured to communicate with UEs over the unlicensed spectrum. Further, the cell 120A may be configured with various processing components that are configured to perform various operations such as, but not limited to, receiving signals from UEs and other network components, processing received signals and generating signals for transmission. For example, the cell 120A may be equipped with one or more processors. The processors may include one or more baseband processors and/or one or more applications processors. These processors may be configured to execute software and/or firmware. In another example, the cell may be equipped with an integrated circuit with or without firmware. For example, the integrated circuit may include input circuitry to receive signals, processing circuitry to process the signals and other information and output circuitry to output generated signals and information to other components (e.g., a communication interface, a transceiver, etc.). The functionality described herein for the cell 120A may be implemented in any of these or other configurations known in the art for a cell of a network.

In addition to the networks 120 and 122 the network arrangement 100 also includes a cellular core network 130. The cellular core network 130 may be considered to be the interconnected set of components that manages the operation and traffic of the cellular network. The network arrangement 100 also includes the Internet 140, an IP Multimedia Subsystem (IMS) 150, and a network services backbone 160. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
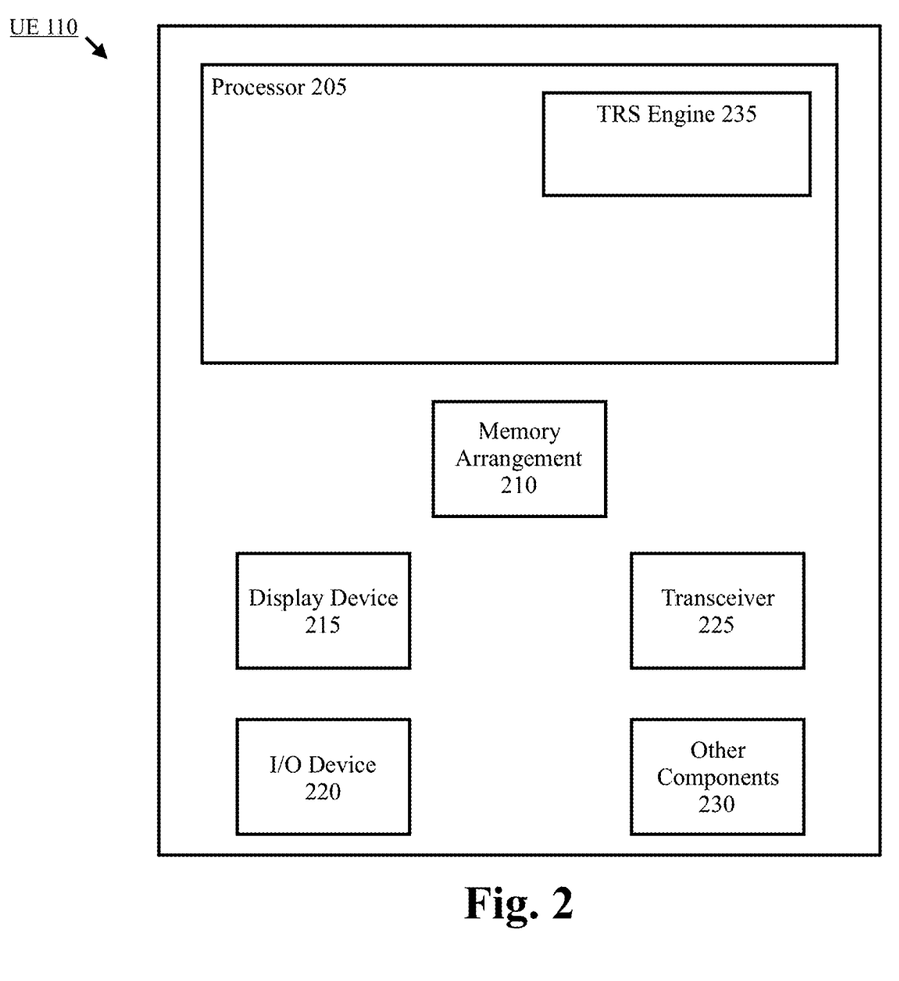
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a TRS engine 235. The TRS engine 235 may be configured to implement various exemplary techniques related to monitoring for and receiving TRS.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and the WLAN 122. Accordingly, the transceiver 225 may operate on a variety of different frequencies or channels (e.g., set of consecutive frequencies).

Figure 3A:
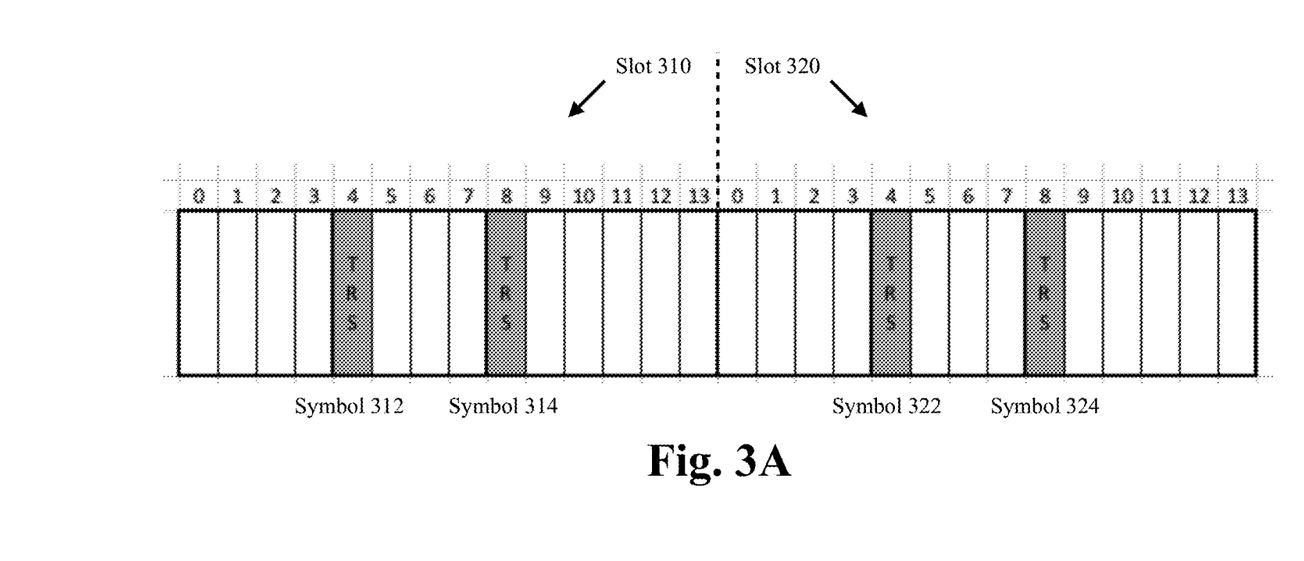
FIG. 3A shows an example of a tracking reference signal (TRS) that spans multiple slots.
Figure 3B:
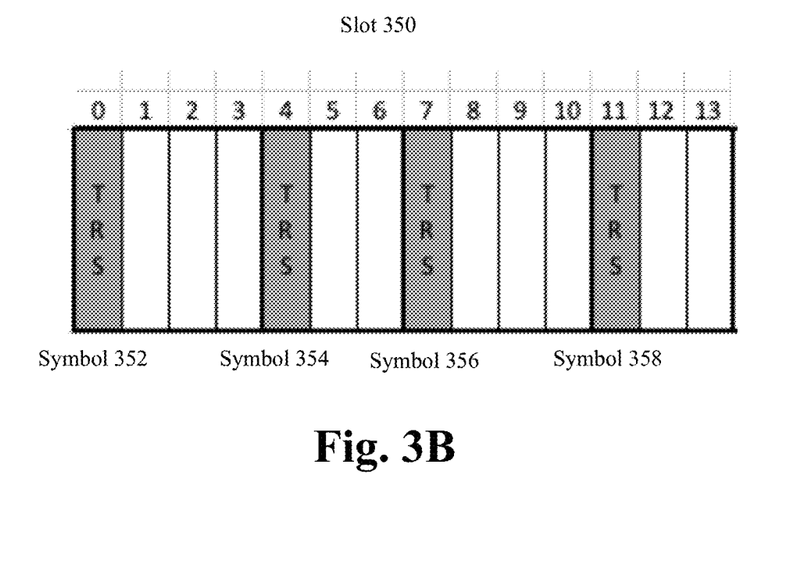
FIG. 3B shows an example of a TRS configured within a single slot.

As mentioned above, the exemplary embodiments relate to TRS transmission and reception. Those skilled in the art will understand that a TRS may represent multiple TRS symbols carried in one or more slots. There are a variety of different combinations of symbols and slots that may be used for a TRS. FIGS. 3A and 3B each provide an example of a TRS configuration. However, any reference to a TRS being configured with a particular number of symbols or a particular number of slots is merely provided for illustrative purposes. The exemplary embodiments are not limited to any particular TRS configuration and may apply to a TRS or similar downlink reference signal being configured with any appropriate combination of symbols and slots.

FIG. 3A shows an example of a TRS that spans multiple slots. In this example, a first slot 310 includes two TRS symbols 312, 314 with three symbols in between the two TRS symbols 312, 314. This TRS also includes a second adjacent slot 320 that also includes two TRS symbols 322, 324 with three symbols in between the two TRS symbols 322, 324.

FIG. 3B shows an example of a TRS configured within a single slot. In this example, slot 350 is configured to include four TRS symbols 352-358 with two or three symbols in between each of the TRS symbols 352-358. Although not shown in FIG. 3B, in some TRS configurations, there may be three symbols in between a first TRS symbol and a third TRS symbol within the same slot. Compared to FIG. 3A, the TRS configuration shown in 3B provides more TRS symbols in the same slot. This TRS configuration may provide power saving benefits to the UE 110 because there are less slots and symbols for the UE 110 to process. As mentioned above, the exemplary embodiments are not limited to a TRS or any particular TRS configuration. The exemplary embodiments may apply to any appropriate downlink reference signal configured with any appropriate combination of symbols and slots.

As mentioned above, the exemplary embodiments may reference a C-DRX cycle or a DRX cycle. During operation, the network may transmit a TRS, prior to an onDuration, that is configured to be used by the UE 110 for frequency and/or tracking. The frequency and/or timing tracking may provide performance benefits with regard to the reception of control information and/or data during the subsequent onDuration. However, reference to these types of cycles is merely for illustrative purposes. The exemplary enhancements described herein are not limited to being used in conjunction with a power saving mode of operation and may be utilized for the transmission and reception of TRS (or any other similar reference signal) in any type of scenario.

When operating on a network cell (e.g., cell 120A), the UE 110 may be configured to be in one of a plurality of different radio resource control (RRC) operating states (e.g., RRC connected state, RRC idle state, RRC inactive state, etc.). As mentioned above, the type of power saving mechanism being utilized by the UE 110 may depend on the RRC state. For example, when the UE 110 is in an RRC idle state or RRC inactive state, the UE 110 may be configured with a DRX cycle. When the UE 110 is in an RRC connected state, the UE 110 may be configured with a C-DRX cycle.

Those skilled in the art will understand that when the UE 110 is in an RRC connected state, the UE 110 and the network may be configured to exchange information and/or data. The exchange of information and/or data may allow the UE 110 to perform functionalities available via the network connection. Further, those skilled in the art will understand that when the UE 110 is in the RRC idle state, the UE 110 is generally not exchanging data with the network and radio resources are not being assigned to the UE 110 within the network. However, when the UE 110 is in RRC idle state, the UE 110 may monitor for information and/or data transmitted by the network (e.g., a TRS, a wake-up signal (WUS), paging, etc.).

Another operating state may be characterized as RRC inactive state. In RRC inactive state, the UE 110 suspends the RRC connection while minimizing signaling and power consumption. Similar to RRC idle state, when the UE 110 is in the RRC inactive state, the UE 110 is generally not exchanging data with the network. When the UE 110 is in RRC inactive state, the UE 110 may still monitor for information and/or data transmitted by the network (e.g., TRS, WUS, paging, etc.). However, any reference to RRC connected state, RRC idle state and RRC inactive state is merely provided for illustrative purposes, the exemplary embodiments may apply to any suitable operating state for the UE 110.

When the UE 110 is camped on a cell and in an RRC idle state or an RRC inactive state, the UE 110 may not be able to exchange data with the network. To exchange data with the network the UE 110 may transition from the RRC idle state to the RRC connected state. For example, while in RRC idle state or inactive state the UE 110 may listen for information such as but not limited to, primary synchronization signals (PSS) and secondary synchronization signals (SSS), Master Information Block (MIB), broadcast messages, System Information Block (SIB), TRS, WUS, paging messages, etc. In response, the UE 110 may issue a request to the network that indicates that the UE 110 wants to be moved to the RRC connected state. A successful transition from the RRC idle state or RRC inactive state to RRC connected state may include the exchange of messages between the UE 110 and the cell of the network. In the RRC connected state, a network context may be established between the cell 120A and the UE 110. Thus, the UE 110 may be assigned radio resources and the UE 110 may be able to exchange data with the network.

As mentioned above, in a first aspect, the exemplary embodiments relate to implementing TRS for RRC idle state or inactive state. The examples provided below will be described with regard to RRC idle state, however, those skilled in the art will understand that the exemplary concepts described herein for RRC idle mode may also be applicable to RRC inactive mode.

Figure 4:
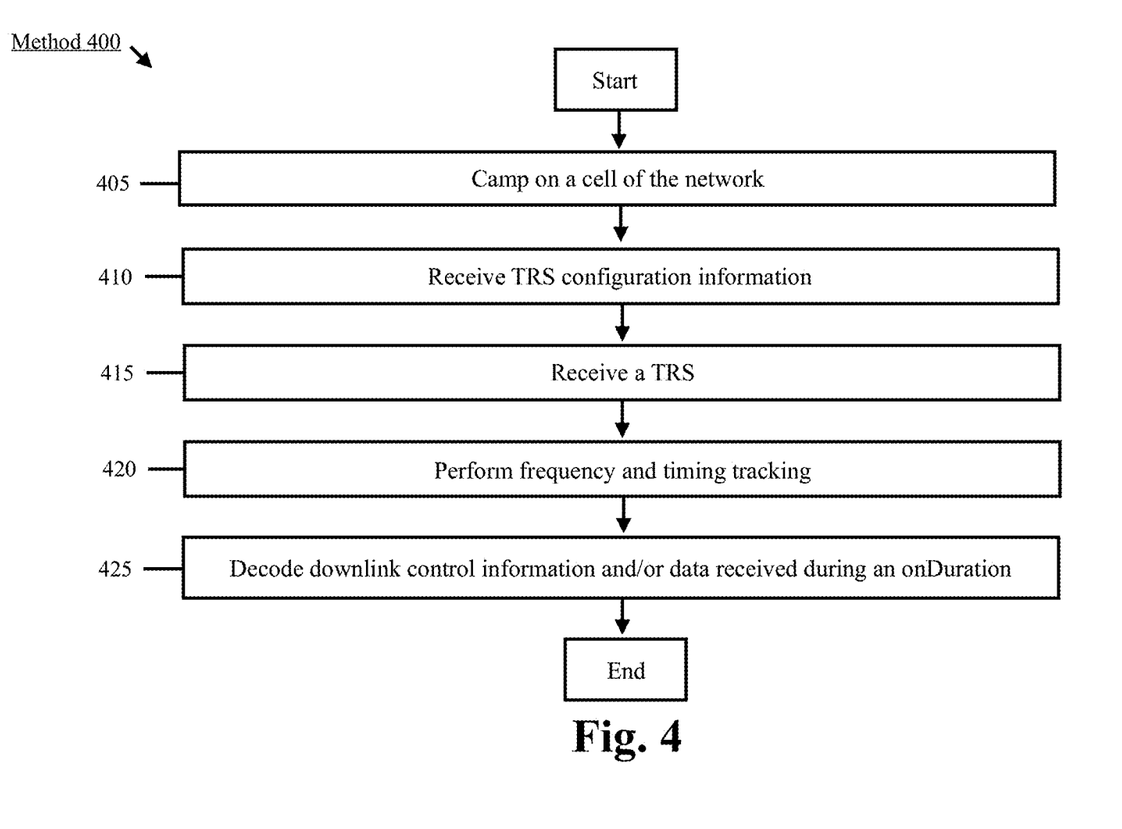
FIG. 4 shows a method for TRS monitoring according to various exemplary embodiments.

FIG. 4 shows a method 400 for TRS monitoring according to various exemplary embodiments. The method 400 is described with regard to the network arrangement 100 of FIG. 1 and the UE 110 of FIG. 2. As will be described in more detail below, the method 400 relates to the UE 110 monitoring for TRS in RRC idle state.

In 405, the UE 110 camps on a cell of the network. For example, the UE 110 may be camped on the cell 120A of the 5G NR RAN 120.

In 410, the UE 110 receives TRS configuration information. The TRS configuration information may indicate to the UE 110 that TRS may be configured for the UE 110 in RRC idle and/or RRC inactive state. As mentioned above, the exemplary embodiments are not limited to TRS. Thus, the TRS configuration information as described herein may represent information that corresponds to any type of downlink reference signal that may be used for timing and frequency tracking, AGC or any other similar type of operation.

In some embodiments, the TRS configuration information may be received in a system information block (SIB) transmitted by the currently camped cell. Thus, the UE 110 may expect that one or more TRS are to be transmitted to the UE 110 after the UE 110 enters RRC idle state and/or RRC inactive state based on a previously received SIB.

In other embodiments, the TRS configuration information may be received in an RRC message. To provide an example, the UE 110 may connect to a cell and operate in RRC connected state. During operation, the UE 110 may receive an RRC connection release message to transition from RRC connected state to RRC idle state. The RRC connection release message may be configured to include TRS configuration information indicating that one or more TRS are to be transmitted to the UE 110 after the UE 110 enters RRC idle mode in response to the RRC connection release message. The above example is merely provided for illustrative purposes, the exemplary embodiments may apply to the TRS configuration information being provided in any appropriate type of RRC signal (e.g., RRC reconfiguration message, RRC state transmission, etc.).

A variety of different types of TRS configurations may be implemented. In one example, a periodic TRS configuration may be implemented. The periodic TRS configuration may include characteristics such as, but not limited to, a TRS periodicity and a TRS slot offset. Thus, the UE 110 may assume that TRS is transmitted by the network in accordance with the TRS periodicity and the TRS slot offset.

In some embodiments, the periodic TRS configuration may account for additional power saving techniques that may be incorporated into the DRX cycle. For example, there may be one or more OnDurations of the DRX cycle where the UE 110 does not have to perform any operations (e.g., receive DCI, receive data, perform a transmission, etc.). Utilizing the active mode of data exchange processing during this type of onDuration would be an inefficient use of the UE 110 power supply. In some networks, the UE 110 may skip an OnDuration of the DRX cycle where the UE 110 does not have to perform any operations and instead, the UE 110 may continue to save power by remaining in the sleep mode of inactivity during the scheduled OnDuration.

The UE 110 may determine whether to wake up or remain asleep during an onDuration based on a wake-up signal (WUS). The WUS may be sent by the network at a predetermined time before a next OnDuration. The UE may monitor for the WUS and if the WUS is received, the UE may wakeup for the next OnDuration and if the WUS is not received, the UE may stay in the sleep mode of inactivity with regard to data exchange processing.

If a dynamic or selective onDuration power saving technique like in the example provide above is implemented, the periodic TRS configuration may include a TRS validity window. The TRS validity window may represent a time window that precedes an onDuration during which the UE 110 is to monitor for TRS. If the UE 110 is to remain in an inactive mode of data exchange processing during an onDuration, the UE 110 may also not monitor for TRS. However, if the UE 110 is to wake up during a particular onDuration, the UE 110 may assume that TRS is to be transmitted by the network during the TRS validity window. Like the corresponding onDuration, the UE 110 may decide whether or not to monitor for TRS based on the reception of a WUS and/or identifying any other appropriate indication that the active mode of data exchange processing is to be utilized during an onDuration.

Figure 5:
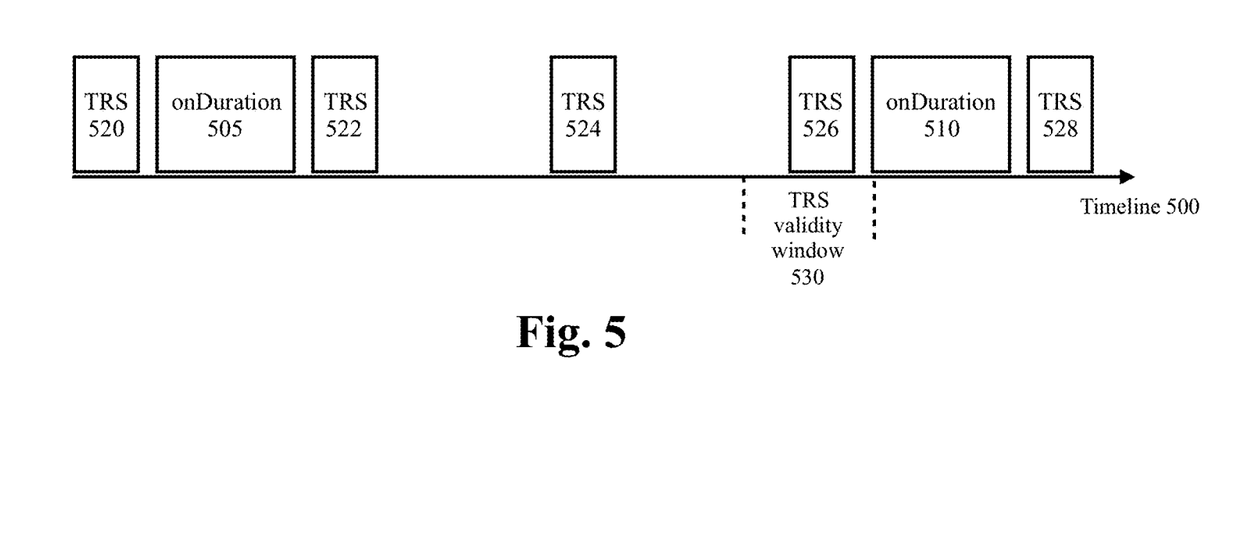
FIG. 5 shows a timeline for a periodic TRS configuration according to various exemplary embodiments.

FIG. 5 shows a timeline 500 for a periodic TRS configuration according to various exemplary embodiments. The timeline 500 includes a first onDuration 505, a second onDuration 510 and five TRS 520-528 scheduled in accordance with a TRS periodicity and TRS slot offset.

In this example, the UE 110 is not scheduled to perform any operation during the first onDuration 505. Thus, the UE 110 may not utilize the active mode of data exchange processing during the onDuration 505. However, in response to a WUS (not pictured) the UE 110 is aware that an operation (e.g., reception of downlink information and/or data) is scheduled for the second onDuration 510. Thus, the UE 110 may utilize the active mode of data exchange processing during the onDuration 510. In addition, since the UE 110 is aware of the scheduled operation in the onDuration 510, the UE 110 may assume that TRS is to be transmitted by the network during the TRS validity window 530.

The five TRS 520-528 are all scheduled for the UE 110. However, if the network knows the next onDuration is not be utilized by the UE 110, the network may omit the transmission of the scheduled TRS. Thus, in this example, TRS 520, 522, 524, 528 may not actually be transmitted. From the UE 110 perspective, in this example, the active mode of data exchange processing may only be utilized during at least a portion of the TRS validity window 530 and at least a portion of the onDuration 520. Since no other operations are scheduled for the UE 110 during the timeline 500, the remaining time may be spent by the UE 110 in the sleep mode of inactivity.

Figure 6:
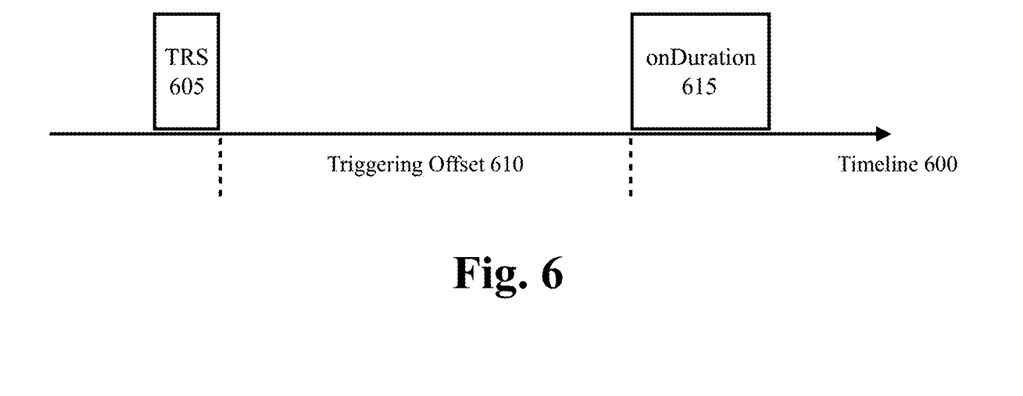
FIG. 6 shows a timeline that includes an example of a triggering offset between a TRS and an onDuration according to various exemplary embodiments.

Returning to the method 400, another type of TRS configuration may be aperiodic TRS. In this type of TRS configuration, a triggering offset may be implemented with respect to a TRS and a next onDuration. FIG. 6 shows a timeline 600 that includes an example of a triggering offset between a TRS and an onDuration. The timeline 600 includes a TRS 605, a triggering offset 610 and an onDuration 615. The triggering offset 610 may refer to an offset defined in units of time, a number of slots or in any other appropriate manner.

To provide an example of aperiodic TRS, initially, the UE 110 may receive TRS configuration information via a SIB, group paging DCI or any other appropriate signal. The TRS configuration information may indicate to the UE 110 that aperiodic TRS is to be implemented for RRC idle state and/or RRC inactive state. In addition, the TRS configuration information may include an indication of a triggering offset. Thus, the UE 110 may determine when the network is expected to transmit TRS 605 based on the scheduled onDuration 615 and the triggering offset 610.

Like in the example provide above with regard to periodic TRS, in some embodiments, the UE 110 may be aware of an aperiodic TRS transmission based on receiving a WUS or any other appropriate type of indication. Thus, in response to a WUS, the UE 110 may utilize the active mode of data exchange processing, i) during an instance of time determined based on the triggering offset and ii) during the subsequent onDuration.

Returning to the method 400, another type of TRS configuration may be semi-persistent TRS. The semi-persistent TRS configuration is similar to the periodic TRS configuration (e.g., triggering offset, etc.). However, the semi-persistent TRS may be activated or deactivated via a SIB, group paging DCI, a medium access control (MAC) control element (CE) addressed to the UE 110 or a group of UEs, or any other appropriate type of signal. In some embodiments, the TRS configuration information and the activation trigger for semi-persistent TRS may be transmitted in the same signal. In other embodiments, the TRS configuration information may be transmitted to the UE 110 in a first message and the activation trigger for semi-persistent TRS may be sent in a second different message.

In 415, the UE 110 receives a TRS. For example, in accordance with the TRS configuration information, the UE 110 may monitor for periodic TRS, aperiodic TRS or semi-persistent TRS. In 420, the UE 110 may perform frequency and timing tracking based on received TRS. In 425, the UE 110 may decode downlink control information and/or data received during an onDuration subsequent to the TRS. The UE 110 may incorporate the frequency and timing tracking into the decoding/reception of the downlink control information and/or data received during the onDuration. Subsequently, the method 400 ends.

In a second aspect, the exemplary embodiments relate to implementing a DCI trigger for TRS reception. For example, a TRS trigger field may be introduced for DCI. This TRS trigger field may be incorporated into exiting types of DCI formats (e.g., format 1_0, format 1_1, format 1_2) or a new format DCI format may be implemented.

The DCI trigger may be used to trigger aperiodic TRS. For an RRC connected mode UE, the slot offset may be configured via one or more messages from the network. For example, the UE 110 may initially receive a list of (N) slot offsets associated with DCI and TRS that may be used by the network. In some embodiments, the UE 110 may also receive a list of (M) out of the (N) slot offsets activated by a MAC CE. The UE 110 may then receive the DCI trigger and select one of the (M) or (N) offsets to receive a subsequent TRS.

For an idle mode UE, in some embodiments, the slot offset may be hardcoded in the 3GPP specification. Thus, both the network and the UE 110 know which predetermined slot offset to implement. In other embodiments, the slot offset may be configured by a SIB. In further embodiments, the slot offset may be configured by DCI (e.g., fallback DCI, non-fallback DCI, etc.) that includes an indication of the slot offset as an additional field of the DCI.

In some embodiments, paging DCI may be enhanced to trigger TRS. From the network perspective, this may entail configuring two different paging occasions (PO). A first PO may be configured for paging DCI that does not include TRS triggering. The first PO is configured for legacy devices that may not support this feature. Thus, a legacy UE may only monitor the legacy PO. A second PO may also be configured for paging DCI that includes TRS triggering. In one example, the UE 110, which supports paging DCI that includes TRS triggering, may monitor both the first PO and the second PO configured by the network. In a second example, the UE 110 may only be required to monitor for the second PO for paging DCI that includes TRS triggering.

Figure 7:
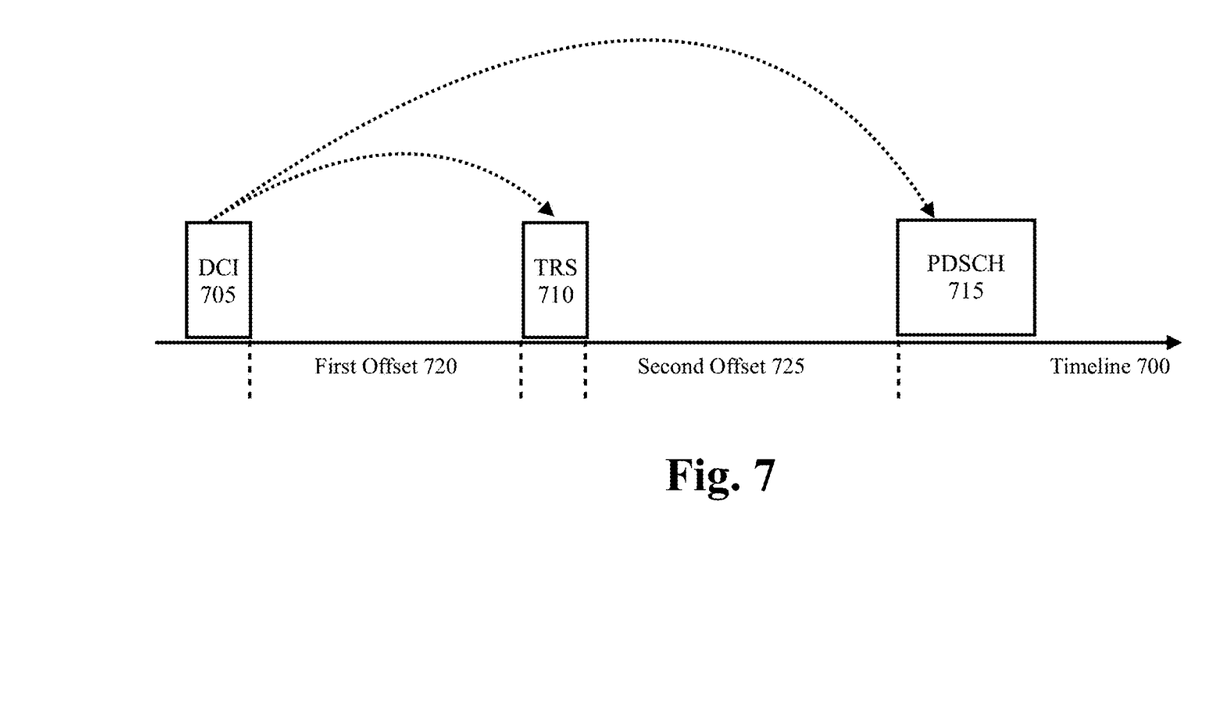
FIG. 7 shows a timeline that includes an example of physical downlink shared channel (PDSCH) scheduling DCI triggering both aperiodic TRS and PDSCH reception according to various exemplary embodiments.

In addition, PDSCH scheduling DCI may be configured to trigger both aperiodic TRS and PDSCH reception. FIG. 7 shows a timeline 700 that includes an example of PDSCH scheduling DCI triggering both aperiodic TRS and PDSCH reception. The timeline 700 includes DCI 705, a TRS 710 and PDSCH 715.

The TRS 710 and the PDSCH 715 are transmitted by the network separately. This may provide power saving benefits to the UE 110 because it allows the UE 110 to perform sequential operations without having to buffer multiple samples.

In some embodiments, the UE 110 may indicate to the network a first minimum offset 720 and a second minimum offset 725. These offsets may be transmitted to the network as part of capability information, RRC signaling, NAS signaling, or any other appropriate signaling exchange. The first minimum offset 720 may represent an offset between DCI and TRS that allows the UE 110 to finish processing the DCI and prepare for TRS reception (e.g., beam switch timing, DCI decoding time, analog beam switch time, etc.). The second minimum offset 725 may represent an offset between the TRS and the scheduled PDSCH that allows the UE 110 to finish performing timing and frequency tracking before processing the PDSCH. In other embodiments, the first offset 720 and the second offset 725 may be hardcoded in the 3GPP specification.

Figure 8:
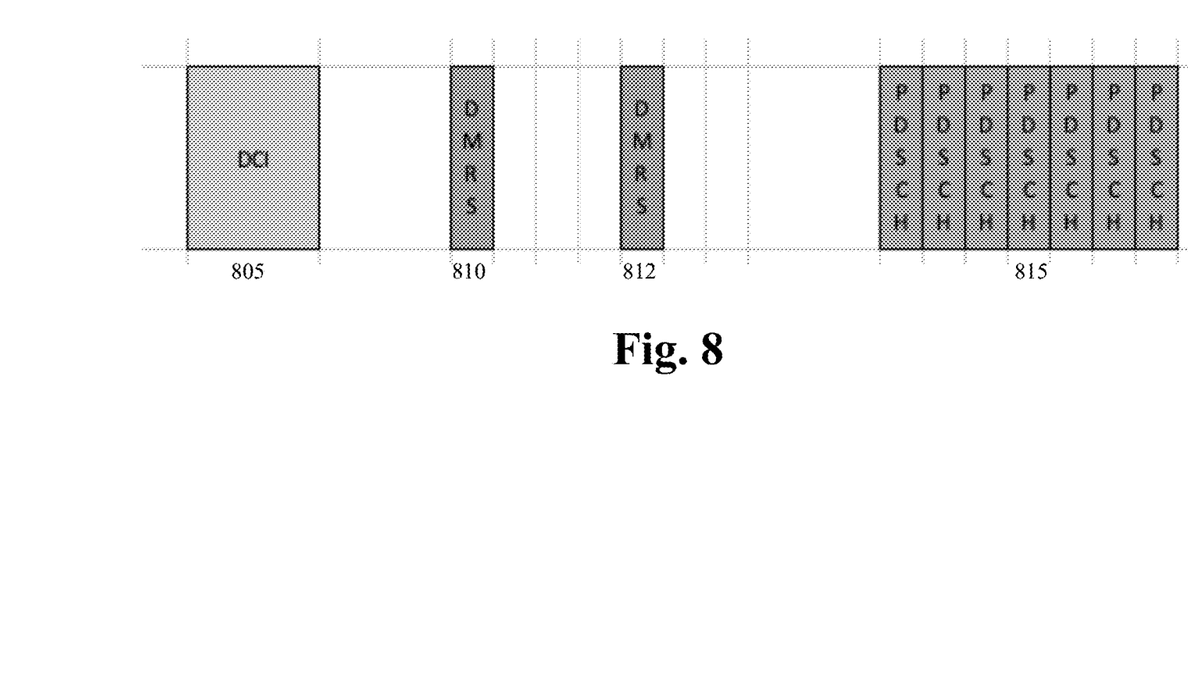
FIG. 8 shows an example of joint demodulation reference signal (DMRS) TRS design according to various exemplary embodiments.

As mentioned above, the exemplary embodiments are not limited to TRS. For example, in some embodiments, demodulation reference signal (DMRS) may be used for both timing/frequency tracking and channel estimation. FIG. 8 shows an example of joint DMRS TRS design. FIG. 8 includes DCI 805, first DMRS 810, second DMRS 812 and PDSCH 815. In this example, unlike legacy designs where DMRS is part of the PDSCH, the DMRS 810, 812 is moved ahead of the PDSCH 815. Thus, in this example, the DCI 805 may be used to trigger the reception of the DMRS 810, 812 and the PDSCH 815.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A baseband processor configured to perform operations comprising:
   receiving configuration information corresponding to a reference signal that is to be transmitted to a user equipment (UE) when the UE is in a first operating state;
   receiving the reference signal from a cell of a network when the UE is in the first operating state;
   performing one of frequency and timing tracking or automatic gain control (AGC) using the reference signal;
   receiving a list of slot offsets relative to downlink control information (DCI) and the reference signal, wherein the list of slot offsets is received in a radio resource control (RRC) message;
   receiving the DCI prior to receiving the reference signal when the UE is operating in an RRC connected state, wherein the DCI and the reference signal are separated by one of the slot offsets included in the list of slot offsets; and
   receiving a signal from the cell during a time window that the UE is scheduled to utilize an active mode of data exchange processing.

2. The baseband processor of claim 1, wherein the reference signal comprises a tracking reference signal (TRS), the first operating state comprises a radio resource control (RRC) idle state or an RRC inactive state and the time window that the UE is scheduled to utilize the active mode of data exchange processing is an onDuration of a discontinuous reception (DRX) cycle.

3. The baseband processor of claim 1 or 2, wherein the configuration information is received in a system information block (SIB).

4. The baseband processor of claim 1 or 2, wherein the configuration information is received in a radio resource control (RRC) connection release message.

5. The baseband processor of claim 1, wherein the reference signal is configured for periodic transmission by the cell when the UE is in the first operating state.

6. The baseband processor of claim 1 or 5, wherein the time window that the UE is scheduled utilize an active mode of data exchange processing comprises an onDuration of a discontinuous reception cycle (DRX) and the first operating state comprises a radio resource control (RRC) idle state or a RRC inactive state, and wherein the operations further comprise:
   configuring a validity time window that is to occur prior to the onDuration, wherein the UE only monitors for the reference signal during the validity time window when the UE is in the RRC idle state or RRC inactive state.

7. The baseband processor of claim 1,
   wherein the time window that the UE is scheduled utilize an active mode of data exchange processing comprises an onDuration of a discontinuous reception cycle (DRX), and
   wherein the reference signal is configured for aperiodic transmission by the cell when the UE is in the first operating state, wherein aperiodic transmission is based on a triggering offset relative to the reference signal and the onDuration.

8. The baseband processor of claim 1, wherein the reference signal is configured for semi-persistent transmission by the cell when the UE is in the first operating state.

9. The baseband processor of claim 1, wherein the reference signal is a tracking reference signal (TRS) that includes more than two IRS symbols in a single slot.

10. A user equipment (UE), comprising:
   a transceiver configured to communicate with a network; and
   a processor communicatively coupled to the transceiver and configured to perform operations comprising:
     receiving configuration information corresponding to a reference signal that is to be transmitted to the UE;
     receiving the reference signal from a cell of the network;

performing one of frequency and timing tracking or automatic gain control (AGC) using the reference signal;

receiving downlink control information (DCI) prior to receiving the reference signal, wherein the DCI is configured to trigger both tracking reference signal (TRS) reception and physical downlink shared channel (PDSCH) reception, wherein the DCI is separated from the TRS by a first offset that is configured based on DCI decoding time and the TRS is separated by the PDSCH by a second offset that is configured based on a duration required for the UE to perform the time and frequency tracking; and receiving a signal from the cell, wherein receiving the signal includes decoding the signal based on the frequency and timing tracking.

11. The UE of claim 10, wherein the reference signal comprises a tracking reference signal (TRS) that includes more than two TRS symbols in a single slot.

12. The UE of claim 10, wherein the reference signal is a demodulation reference signal (DMRS) that is not included in physical downlink shared channel (PDSCH) data.

13. The UE of claim 10, wherein the operations further comprise:

receiving downlink control information (DCI) prior to receiving the reference signal when the UE is operating in an RRC idle state or an RRC inactive state, wherein the DCI and the reference signal are separated by a slot offset.

14. The UE of claim 13, wherein the slot offset is one of i) a predetei wined value, ii) indicated in a system information block (SIB) or iii) indicated in a field of the DCI.

15. The UE of claim 10, wherein the reference signal comprises a tracking reference signal (TRS), and the operations further comprise:

monitoring for a paging downlink control information (DCI) that is configured to trigger the TRS.

16. The UE of claim 10, wherein the reference signal comprises a tracking reference signal (TRS) configured for periodic transmission by the cell when the UE is in a radio resource control (RRC) idle state or an RRC inactive state.

17. The UE of claim 10, wherein the reference signal comprises a tracking reference signal (TRS) configured for aperiodic transmission by the cell when the UE is in a radio resource control (RRC) idle state or an RRC inactive state.

* * * * *

UNITED STATES PATENT AND TRADEMARK OFFICE
CERTIFICATE OF CORRECTION

| | | |
|---|---|---|
| PATENT NO. | : 12,035,238 B2 | Page 1 of 1 |
| APPLICATION NO. | : 17/593516 | |
| DATED | : July 9, 2024 | |
| INVENTOR(S) | : Sun et al. | |

It is certified that error appears in the above-identified patent and that said Letters Patent is hereby corrected as shown below:

In the Claims

Claim 14, Column 14, Lines 7-8:
"i) a predetei wined value, ii) indicated a system information block (SIB) or iii) indicated in a filed of the DCI." should read as "i) a predetermined value, ii) indicated a system information block (SIB) or iii) indicated in a filed of the DCI."

Signed and Sealed this
Twenty-fourth Day of September, 2024

Katherine Kelly Vidal
*Director of the United States Patent and Trademark Office*